United States Patent
Brundage

(10) Patent No.: US 10,084,870 B1
(45) Date of Patent: Sep. 25, 2018

(54) IDENTIFYING USER SEGMENT ASSIGNMENTS

(71) Applicant: Amazon Technologies, Inc., Reno, NV (US)

(72) Inventor: Michael L. Brundage, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 914 days.

(21) Appl. No.: 14/474,610

(22) Filed: Sep. 2, 2014

Related U.S. Application Data

(63) Continuation of application No. 13/044,609, filed on Mar. 10, 2011, now Pat. No. 8,838,522.

(51) Int. Cl.
*H04L 29/08* (2006.01)

(52) U.S. Cl.
CPC .................... *H04L 67/22* (2013.01)

(58) Field of Classification Search
None
See application file for complete search history.

(56) References Cited

U.S. PATENT DOCUMENTS

| | | | |
|---|---|---|---|
| 8,838,522 B1 * | 9/2014 | Brundage | G06N 5/04 706/54 |
| 2003/0101449 A1 * | 5/2003 | Bentolila | G06Q 30/0251 725/10 |
| 2009/0132368 A1 | 5/2009 | Cotter et al. | |
| 2009/0276377 A1 * | 11/2009 | Dutta | G06Q 30/02 706/12 |
| 2010/0203876 A1 * | 8/2010 | Krishnaswamy | G06Q 30/02 455/418 |

OTHER PUBLICATIONS

Bounsaythip, Catherine et al.; "Overview of Data Mining for Customer Behavior Modeling"; 2001; VTT Information Technology 18 (2001); Research Report TTE1-2001-18; pp. 1-53.*
Bounsaythip, Catherine et al.; "Overview of Data Mining for Customer Behavior Modeling"; 2001; VTT Information Technology 18 (2001); Research ReportTTE1-2001-18; pp. 1-53.

* cited by examiner

*Primary Examiner* — Paulinho E Smith
(74) *Attorney, Agent, or Firm* — Thomas | Horstemeyer, LLP

(57) ABSTRACT

Disclosed are various embodiments for identifying segment assignments of users within segments of interest. Historical user behavior associated with users for whom segment assignments within segments of interest is analyzed. Probabilities associating possible segment assignments within a segment of interest with user behavior are calculated. User behavior of anonymous users and/or users for which segment assignments are unknown can be determined along with a confidence score.

20 Claims, 4 Drawing Sheets

IDENTIFYING USER SEGMENT ASSIGNMENTS

CROSS-REFERENCE TO RELATED APPLICATIONS

This application is a continuation of and claims the benefit of U.S. patent application Ser. No. 13/044,609, entitled "IDENTIFYING USER SEGMENT ASSIGNMENTS," and filed Mar. 10, 2011, which is hereby incorporated by reference in its entirety.

BACKGROUND

Operators of electronic commerce systems, advertising networks, content delivery networks, or any system in which content is delivered may wish to know more information about users. Some users, particularly in the context of the Internet in which users are communicating with a system via a browser, mobile application, or the like, can be effectively anonymous to the operator of the system. That is to say, the user may not be associated with a user account or identity for which demographic information is known. Accordingly, in such a scenario, targeting users with relevant content can be difficult, as the system does not possess any demographic or other information on which to base targeting decisions.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to determining demographic information about users of a content server. A content server can include, but is not limited to a search engine, electronic commerce system in which users can search, browse, and/or purchase products, or any other system in which users interact with one or more computing devices over a network. An operator of a content server may desire to target users with content that is based at least upon the various demographic segments to which the user belongs. However demographic segment assignments pertaining to some users may be unknown, making targeting based on these segment assignments difficult. Additionally, other users may be effectively anonymous in that the user is not associated with a user account or other tracking mechanisms, which can also render content targeting difficult. Therefore, embodiments of the disclosure can associate segment assignments with such users along with a confidence score upon which improved content targeting can be accomplished.

Figure 1:
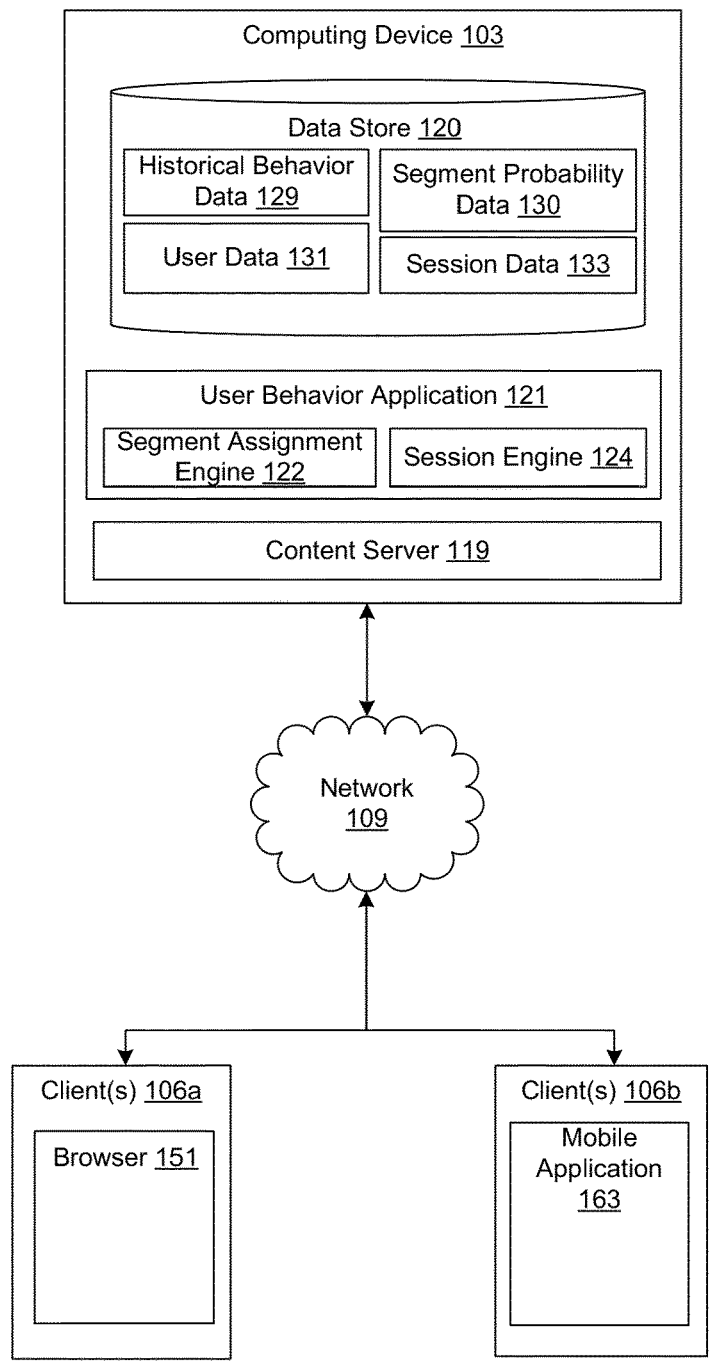
FIG. 1 is a drawing of networked environment according to various embodiments of the present disclosure.

With reference to FIG. 1, shown is a networked environment 100 according to various embodiments. The depicted networked environment 100 illustrates one example of an implementation of a system according to an embodiment of the disclosure. It should be appreciated that embodiments of the disclosure can be implemented in various ways. The networked environment 100 includes at least one computing device 103 and one or more clients 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include a content server 119, a user behavior application 121, and other applications, services, processes, systems, engines, or functionality not discussed in detail herein. The content server 119 can facilitate delivery of content, such as network pages (e.g., HTML pages), multimedia content, and any other content over the network 109 to one or more clients 106. In one embodiment, the content server 119 can include a web server configured to deliver web pages to a browser executed on a client 106. The content server 119, in one embodiment, can also receive data from a browser executed a client 106, which can include, but is not limited to, browser requests to retrieve data served up by the content server 119, and other data as can be appreciated. The content server 119 can also include logic that dynamically constructs web pages from data retrieved from the data store 120 and/or other sources. To this end, the content server 119 can communicate with other systems, services, application programming interfaces, etc., to facilitate the collection of data from users as well as the dynamic generation of content.

The content server 119 can facilitate various types of sites that deliver content to users. In one embodiment, the content server 119 can facilitate a search engine, electronic commerce site, and other forms of sites that deliver content to users over a network 109 as can be appreciated. To this end, the content server can transmit network pages or other user interface elements that can be rendered on a client 106. Similarly, the content server can receive data submitted by a user via user interface elements rendered on a client 106. The specific functionality and various implementations of a content server 119 should be appreciated by a person of ordinary skill in the art, and is not discussed in further detail herein. The various systems and methods that support the identification of user demographic information can be configured to work in conjunction with a content server 119 and/or any system or application that transmits content to and/or receives content from a client 106.

The user behavior application 121 is executed to identify user information based at least upon user behavior with regard to interactions with the content server 119. In some embodiments, the user behavior application 121 can, based upon the user's behavior in interactions with the content server 119, calculate a probability that an assumption regarding user information, such as a demographic segment assignment, is correct. In other words, the user behavior application 121 can determine with some degree of probability the correctness of an assignment of a user to a demographic segment, such as identification of the user as a male. Such user behavior can include search terms and/or other data submitted via a client 106 to the content server 119. The user behavior can also include traffic received from a specific hyperlink that directs requests for content to the content server 119.

Accordingly, the user behavior application 121 can execute a segment assignment engine 122 that can analyze historical user behavior of users for which demographic segment assignments or other types of segment assignments are known. By analyzing historical user behavior data of users with known segment assignments, the segment assignment engine 122 can calculate a probability associated with a particular user behavior and a segment assignment. For example, the segment assignment engine 122 can identify users of the content server 119 for which a segment assignment corresponding to the user's sex is known. Then, for a particular historical user behavior, such as a search term submitted to the content server 119, the segment assignment engine 122 can calculate a percentage of male users and female users exhibiting the user behavior. Other examples of the calculation of a probability that a user behavior can be associated with a segment assignment are described in more detail below.

The user behavior application 121 can also execute a session engine 124 that can analyze the user behavior associated with users for which segment assignments are unknown. The session engine 124 can generate a confidence score and/or probability that the user can be associated with a segment assignment based at least upon the segment assignments of other users exhibiting the same or similar historical behavior. The functionality of the session engine 124 is described in further detail below.

In some embodiments, the functionality of the user behavior application 121, the segment assignment engine 122 and/or session engine 124 may be included in the content server 119. In other embodiments, the user behavior application 121, segment assignment engine 122, and/or session engine 124 may be executed as a sub-module of the content server 119, or as a separate, standalone application, web service, etc. It should be understood that the depicted embodiment of a content server 119, the user behavior application 121, segment assignment engine 122 and/or session engine 124 is but one example.

Also, the computing device 103 can include at least one data store 120, which may comprise data and applications operable to provide access to the data stored therein. It should be appreciated that the data store 120 may or may not reside within a computing device 103, but may be accessible via a network to the computing device 103. The data store 120 can include historical behavior data 129, which can include various information about user behavior logged by the content server 119 and associated with users. For example, the historical behavior data 129 can include search terms entered by users. As another example, historical behavior data can include traffic generated by a particular hyperlink as well as the identity of users accessing various hyperlinks. Historical behavior data 129 can also include response rates associated with e-mail campaigns and the identity of users to respond to various campaigns and other user behavior data that can be logged in connection with a user's interactions with a content server 119. The historical behavior data 129 can be indexed by users, by a specific user behavior for which data is collected, and in other ways.

Segment probability data 130 can include probabilities calculated by the segment assignment engine 122 that express probabilities that a segment assignment in a segment of interest can be associated with a particular user behavior based at least upon the historical user behavior of users for which a segment assignment in a segment of interest is known. Accordingly, the session engine 124 can determine a segment assignment along with a confidence score for the assignment for users of the content server 119 with unknown assignments within a particular segment of interest based on the segment probability data 130.

The data store 120 can also include user data 131, which can store information about users of a content server 119. As one example, if a content server 119 facilitates an electronic commerce site, user data 131 can include, for example, demographic information about a user. In other words, user data 131 can include segment assignments into various demographic segments of interest associated with a user. In the non-limiting example of an electronic commerce site, user data 131 can also include shipping addresses, telephone numbers, payment information, e-mail addresses, purchasing history, a search history, product browsing history, affinity groups with which the user is affiliated, and other data related to users. In the example of a search engine facilitated by the content server 119, user data 131 can include contact information, a search history, and other data as can be appreciated.

Accordingly, the content server 119 can facilitate targeting of content to users based upon their assignment to various segments of interest tracked by their user data 131. For example, an advertiser may wish to target users of a particular segment of interest such as age range, sex, etc. Accordingly, the content server 119 can facilitate presentation of content to users with particular segment assignments in one or more segments of interest when these users are interacting with the content server 119. However, in some embodiments, data regarding segment assignments of some users may not be known for some users for which user data 131 is stored. Additionally, segment assignments for anonymous users (e.g., users who have not authenticated themselves to the content server 119 and/or users who are not associated with a user account) may also be unknown.

The data store 120 can also include session data 133, which can track user behavior in one or more sessions of interactions with the content server 119. As one example, session data 133 can track behavior of a user by associating the user's session with a session identifier. Session data 133 can include search terms or other textual and multimedia data submitted by the user to the content server 119. Session data 133 can also include URLs followed the user, products viewed in an electronic commerce site, locations viewed on a map site, activity in a social networking site, and other user activity and behavior as can be appreciated. In one embodiment, the content server 119 can set a session cookie in a browser on a client 106 associated with the user to track user behavior of the anonymous user. In another embodiment, the content server 119 can assign a session identifier that is embedded in uniform resource locators (URLs) provided to a browser on a client 106 associated with the user. Other variations of the various ways in which session data 133 should be appreciated. It should be appreciated that the depicted data store 120 and the table structure shown therein is but one example given for ease of depiction and explanation of various embodiments of this disclosure.

The client 106 is representative of one or more client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, tablet computer systems, game consoles, or other devices with like capability.

The client 106a may be configured to execute various applications such as a browser 151 and/or other applications. The browser 151 may be executed in a client 106a, for example, to access and render network pages, such as web pages, or other network content served up by the content server 119 and/or other systems. A client 106b can also be configured to execute a special purpose application, such as a mobile application 163, which may include client side code that renders a user interface that includes data provided by the content server 119.

Next, a general description of the operation of the various components of the networked environment 100 is provided. As referenced above, the user behavior application 121 can calculate a probability that users exhibiting certain behaviors in their interactions with a content server 119 can be assigned to various segments of interest by analyzing historical behavior data 129 associated with users for which segment assignments are known, or "known users." Accordingly, as other users interact with the content server 119, the user behavior application 121 can generate segment assignments associated with a confidence score for anonymous users or other users for which segment assignments are unknown.

Therefore, the segment assignment engine 122 can calculate these probabilities referenced above. The segment assignment engine 122 can comprise an offline process that analyzes historical behavior data 129 of known users. As noted above, historical behavior data 129 can include search terms submitted by users, hyperlinks followed by users, and any other data submitted or content server 119 traffic generated by users of the content server 119. Accordingly, for a given user behavior, such as a search term submitted by various known users, the segment assignment engine 122 can calculate a percentage of known users with their known segment assignments in various segments of interest that exhibit the user behavior.

As one example, assume that a given user behavior stored in the historical user behavior 129 in the data store 120 is a search term such as "television" that is submitted to a search engine facilitated by the content server 119. Assume also that the user data 131 associated with at least a subset of users who have submitted the search term are users for which segment assignments in various segments of interest are known. As one example, assume that a segment of interest is the sex associated with the user. Accordingly, the segment assignment engine 122 can calculate a percentage of male and female users from among known users who have submitted the search term. In one embodiment, assuming an acceptable sample size, the segment assignment engine 122 can determine that these calculated percentages that are associated with each segment assignment can be extrapolated over an entire user population. In other words, if, assuming for the sake of illustration, that the segment assignment engine 122 determines that 90% of known users submitting the search term are male and 10% are female, the segment assignment engine 122 can store these percentages as segment probability data 130 for the user behavior, which is submission of the search term "television," and the segment of interest, which is the sex of the user.

Continuing the above example, assume that an anonymous user or a user for which a segment assignment for the segment of interest (sex) is unknown interacts with the content server 119 and exhibits a single user behavior, and that this user behavior is entry of the search term "television." The session engine 124 can track the session of the user, and if the session engine 124 detects that the user enters the search term "television," it can determine that there is a 90% probability that the user should be associated with a segment assignment of "male" in the segment of interest "sex." Additionally, the session engine 124 can calculate a confidence score associated with such an assignment based at least upon the probability associated with the detected user behavior. Such a confidence score can also consider other factors, such as a sample size of user behaviors considered in a session. Accordingly, the session engine 124 can inform decisions to target the user based upon demographic targeting preferences with content based on this probability. For example, if an advertiser desires to target a male demographic with advertising content, the advertiser can do so with a greater likelihood that the user is being correctly targeted.

Additionally, the probability of a user being associated with a given segment assignment can be updated by the session engine 124 as the user exhibits additional behavior in interactions with the content server 119. As an example, if the anonymous user in the above example exhibits another user behavior for which the segment assignment engine 122 has determined segment probability data 130, the session engine 124 can recalculate a probability associated with a user's segment assignment. In other words, a probability that a user is correctly associated with one or more segment assignments in one or more segments of interest can be updated as additional observations about the behavior of the user are made by the session engine 124, observations of behavior for which segment probability data 130 has been determined by the segment assignment engine 122 about a plurality of users for which segment assignments in various segments of interest are known.

In some embodiments, the session engine 124 can take into account the previous N observations of user behavior associated with a user in calculating the probability and/or confidence score associated with a segment assignment determination. In this way, the session engine 124 can maintain a moving time window of user behavior observations. As one example, the session engine 124 can observe multiple search terms entered by a user in a session and calculate transition probabilities emanating from the various segment assignments that are associated with the entered search terms. Accordingly, the session engine 124 can calculate a probability that an anonymous user is associated with any one of the possible segment assignments based upon the observed behavior of the user.

Additionally, the session engine 124 can calculate multiple segment assignments with associated probabilities and/or confidence scores. For example, the session engine 124 can determine a probability and/or confidence score that a user should be assigned to segments of interest that can include sex, income, race, and any other segment of interest based upon a single observed user behavior. Embodiments of the disclosure can employ various methods of statistical inference, which can include, but are not limited to Bayesian inference, Hidden Markov Models, and other mathematical and/or statistical models from which an inference and/or probability is determined based upon one or more observations about the behavior of the user.

Figure 2:
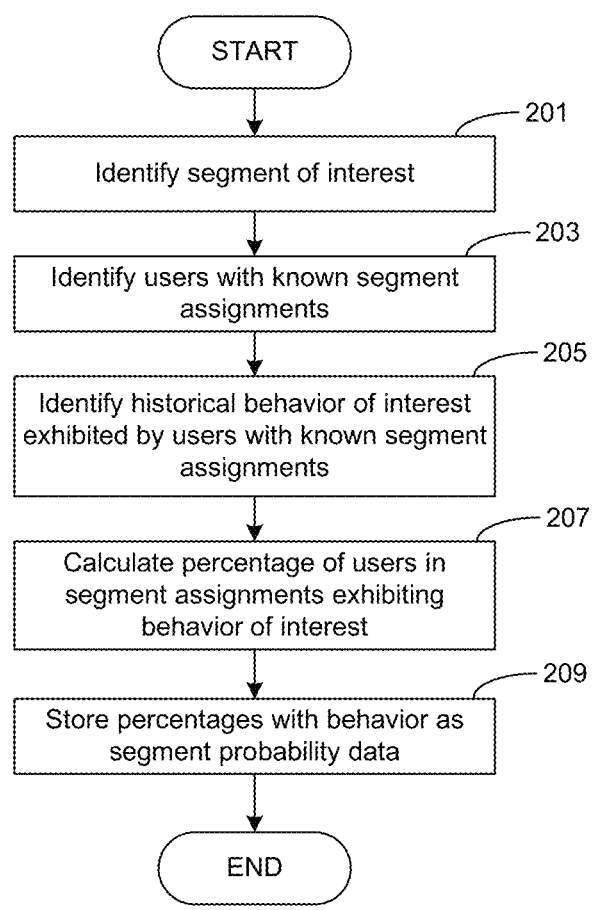
FIG. 2 is a flowchart illustrating one example of functionality implemented as portions of user behavior application executed in a computing device in the networked environment of FIG. 1 according to various embodiments of the present disclosure.

Referring next to FIG. 2, shown is a flowchart that provides one example of the operation of a portion of the segment assignment engine 122 executed by the user behavior application 121 according to various embodiments. It is understood that the flowchart of FIG. 2 provides merely an example of the many different types of functional arrangements that may be employed to implement the operation of the portion of the segment assignment engine 122 as described herein. As an alternative, the flowchart of FIG. 2 may be viewed as depicting an example of steps of a method implemented in the computing device 103 (FIG. 1) according to one or more embodiments.

As noted above, the segment assignment engine 122 can include a process that runs against a corpus of historical behavior data 129 that is associated with users having known segment assignments in one or more segments of interest. Accordingly, beginning with box 201, the segment assignment engine 122 can identify a segment of interest for which segment probability data 130 is to be determined. As noted above, segment probability data 130 can include one or more categories in which users can be associated with a segment assignment. These categories can include demographic categories, group memberships, or any categories in which users can be grouped. In box 203, the segment assignment engine 122 can identify users in user data 131 for whom a segment assignment in the segment of interest are known.

In box 205, the segment assignment engine 122 can identify those users in the segment of interest who are associated with historical behavior data 129 corresponding to the behavior of interest. As noted above, a behavior of interest can include a search performed in a search engine, electronic commerce site, etc., as well as other user behavior data that can be tracked in a content server 119 (FIG. 1). In box 207, the segment assignment engine 122 can calculate a percentage of users in the various segment assignments in the segment of interest. Accordingly, in box 209, these percentages can be stored associated with the behavior interest as segment probability data 130. These percentages can be equated to a probability that an anonymous user or a user for which a segment assignment in the segment of interest is unknown that exhibits the same user behavior falls within a particular segment assignment in the segment of interest.

Figure 3:
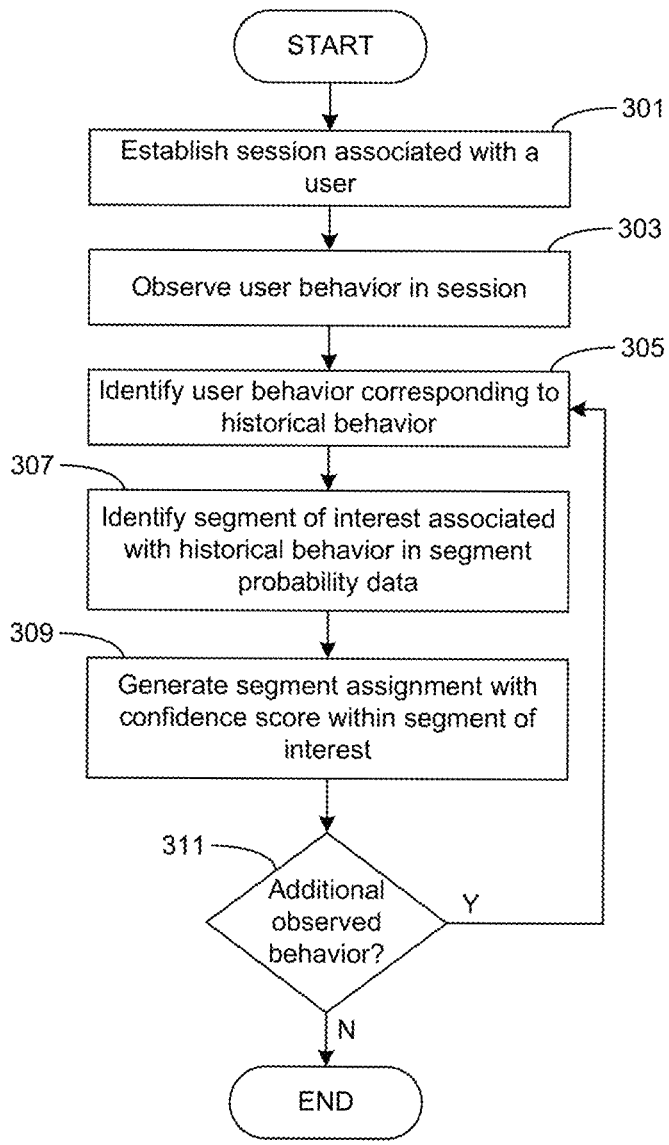
FIG. 3 is a flowchart illustrating one example of functionality implemented as portions of user behavior application executed in a computing device in the networked environment of FIG. 1 according to various embodiments of the present disclosure.

Reference is now made to FIG. 3, which is a flowchart that provides one example of the operation of a portion of the session engine 124 executed by the user behavior application 121 according to various embodiments. It is understood that the flowchart of FIG. 3 provides merely an example of the many different types of functional arrangements that may be employed to implement the operation of the portion of the session engine 124 as described herein. As an alternative, the flowchart of FIG. 3 may be viewed as depicting an example of steps of a method implemented in the computing device 103 (FIG. 1) according to one or more embodiments.

As noted above, the session engine 124 can generate segment assignments associated with a confidence score for anonymous user or users for which segment assignments in a segment of interest are unknown. Accordingly, in box 301, the session engine 124 can establish a session for a user. In some embodiments, a session can be established for an anonymous user by establishing a session cookie in a browser on a client. In other embodiments, a session can be established by passing a session identifier as a part of a URL or other data passed between a client and the content server 119. Other variations of session tracking should be appreciated. It should also be appreciated that in some embodiments, establishment of a session may be bypassed, and the session engine 124 can determine segment assignments of a user by observing a single user behavior.

In box 303, the session engine 124 can observe user behavior in the session. In one embodiment, the session engine 124 can track data submitted to the content server by the user (e.g. search terms, form data, etc.), hyperlinks clicked by the user, or other user behavior data. In box 305, the session engine 124 can identify user behavior in the session that corresponds to historical behavior data 129. In box 307, the session engine 124 can identify a segment of interest that is associated with the identified historical behavior data in the segment probability data 130. In box 309, the session engine 124 can generate a segment assignment with a confidence score for the user. In one embodiment, the session engine 124 can generate a confidence score and/or probability associated with each possible segment assignment within a given segment of interest. In other embodiments, the session engine 124 can identify the most likely segment assignment. In box 311, the session engine 124 can determine if there are additional user behavior observations for which a segment assignment confidence score can be generated.

Figure 4:
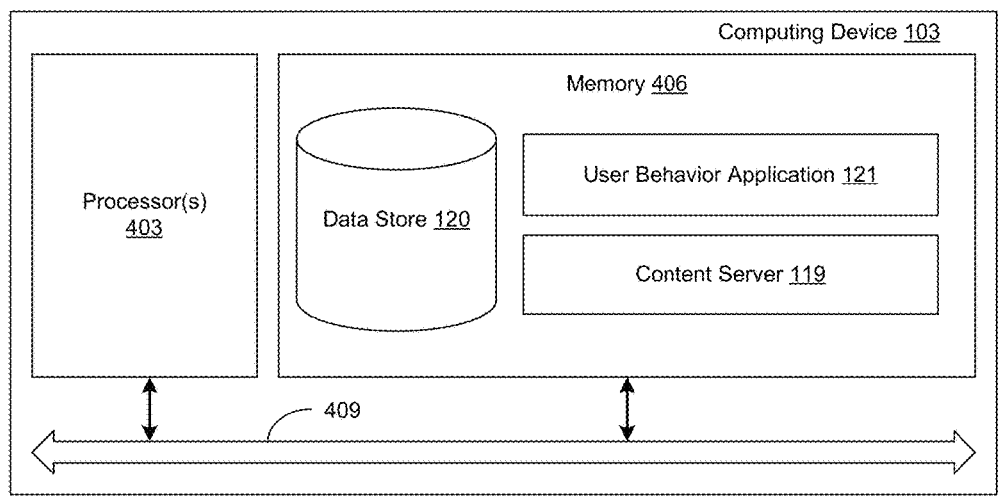
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the content server 119, user behavior application 121, and potentially other applications. Also stored in the memory 406 may be a data store 120 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the content server 119, user behavior application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the user behavior application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content server 119 and/or user behavior application 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, causing the computing device to at least:
   identify a plurality of authenticated users for which at least one segment assignment in at least one segment of interest is known based upon a respective user account of individual ones of the plurality of authenticated users;
   identify at least one of a plurality of historical user behaviors associated with at least a subset of the authenticated users;
   calculate, for the at least one of the plurality of historical user behaviors, a percentage of the authenticated users in each segment assignment associated with the at least one segment of interest that demonstrates the at least one of the plurality of historical user behaviors;
   store the percentage in a data store;
   identify a behavior associated with an unauthenticated user;
   identify one of the plurality of historical user behaviors corresponding to the behavior;
   identify a segment of interest associated with the one of the plurality of historical user behaviors;
   associate the unauthenticated user with a first segment assignment in the segment of interest associated with a highest percentage of the authenticated users for which the first segment assignment is known who have exhibited the behavior; and
   target the unauthenticated user with content associated with the first segment assignment in the segment of interest associated with the highest percentage of the authenticated users for which the first segment assignment is known who have exhibited the behavior.

2. The non-transitory computer-readable medium of claim 1, further causing the computing device to at least calculate a confidence score associated with the first segment assignment of the unauthenticated user.

3. The non-transitory computer-readable medium of claim 1, wherein the at least one of the plurality of historical user behaviors comprises a response rate associated with how frequently a user responds to a plurality of email campaigns.

4. A system, comprising:
   at least one computing device;
   a data store in communication with the at least one computing device; and
   a user behavior application executable in the at least one computing device, the user behavior application causing the at least one computing device to at least:
   identify at least one segment of interest among a user population;
   identify a plurality of authenticated users from the user population with a known segment assignment in the at least one segment of interest based upon a respective user account associated with individual ones of the plurality of authenticated users;
   identify at least one behavior of interest in connection with at least one of the plurality of authenticated users;
   calculate a percentage of the plurality of authenticated users in each of a plurality of possible segment assignments associated with the at least one segment of interest who exhibit the at least one behavior of interest;
   store the percentage in a data store;
   observe a user behavior associated with an unauthenticated user of the at least one computing device;
   determine whether the user behavior corresponds to the at least one behavior of interest;
   assign the unauthenticated user to a segment assignment in the at least one segment of interest associated with a highest percentage of users who are known to have exhibited the at least one behavior of interest; and
   target the unauthenticated user with content that is relevant to the segment assignment within the at least one segment of interest.

5. The system of claim 4, wherein the at least one behavior of interest is retrieved from historical behavior data associated with a plurality of tracked user sessions stored in the data store.

6. The system of claim 5, wherein the at least one behavior of interest comprises at least a response rate associated with how frequently the at least one of the plurality of authenticated users responds to a plurality of email campaigns.

7. The system of claim 5, wherein the historical behavior data comprises at least one of: product view history an electronic commerce site, a history associated with a plurality of locations viewed on a map site, or a plurality of interactions on a social networking site.

8. The system of claim 4, wherein the at least one behavior of interest further comprises a search term submitted to a search engine by the unauthenticated user.

9. The system of claim 4, wherein the at least one behavior of interest further comprises a hyperlink activated by the unauthenticated user.

10. The system of claim 4, wherein the at least one segment of interest further comprises at least one demographic category, the at least one demographic category being at least one of: sex, age, income, race, marital status, familial status, home ownership status, employment status, language, or geographic location.

11. The system of claim 4, wherein the user behavior application further comprises logic that calculates a confidence score associated with the assignment of the unauthenticated user to the segment assignment based at least upon the highest percentage of the plurality of authenticated users who are known to have exhibited the at least one behavior of interest.

12. The system of claim 11, wherein the user behavior application further causes the at least one computing device to at least:
   observe a second user behavior associated with the unauthenticated user;
   determine whether the second user behavior corresponds to another historical behavior associated with the at least one segment of interest;
   assign the unauthenticated user to a segment assignment corresponding to the another historical behavior within the at least one segment of interest; and
   update the confidence score associated with the assignment of the unauthenticated user to the segment assignment based at least upon the percentage associated with the segment assignment and the second user behavior.

13. A method, comprising:
identifying, in at least one computing device, a plurality of authenticated users for which at least one segment assignment in at least one segment of interest is known based upon a respective user account of individual ones of the plurality of authenticated users;
identifying, in the at least one computing device, at least one historical user behavior associated with at least a subset of the authenticated users;
calculating, in the at least one computing device, for the at least one historical user behavior, a percentage of the plurality of authenticated users in at least one possible segment assignment associated with the at least one of segment of interest that exhibit the at least one historical user behavior;
storing, in the at least one computing device, the percentage in a data store accessible to the at least one computing device;
establishing, in the at least one computing device, a session associated with an unauthenticated user for which the at least one segment assignment in at least one segment of interest is unknown;
observing, in the at least one computing device, a behavior associated with the unauthenticated user;
identifying, in the at least one computing device, the at least one historical behavior corresponding to the behavior associated with the unauthenticated user;
identifying, in the at least one computing device, a segment of interest associated with the at least one historical behavior;
associating, in the at least one computing device, the unauthenticated user with a first segment assignment in the segment of interest; and
targeting, in the at least one computing device, the unauthenticated user with content that is relevant to the first segment assignment.

14. The method of claim 13, wherein the first segment assignment is associated with a highest percentage of the plurality of authenticated users for which the first segment assignment is known who have exhibited the observed behavior.

15. The method of claim 13, further comprising calculating, in the at least one computing device, a confidence score associated with the first segment assignment, the confidence score being based at least upon at least one of: the percentage or a number of observations of user behavior.

16. The method of claim 15, further comprising:
observing, in the at least one computing device, a plurality of subsequent behaviors associated with the unauthenticated user;
identifying, in the at least one computing device, at least one corresponding historical behavior corresponding to at least one of the subsequent behaviors;
identifying, in the at least one computing device, at least one segment of interest associated with the at least one corresponding historical behavior; and
updating, in the at least one computing device, the calculation of the confidence score when the at least one segment of interest associated with the at least one corresponding historical behavior is identical to the segment of interest.

17. The method of claim 16, wherein updating the calculation of the confidence score further comprises calculating, in the at least one computing device, an aggregate probability based at least upon on a plurality of observations of user behavior associated with the segment of interest, the confidence score that is updated being based at least upon the aggregate probability.

18. The method of claim 16, wherein the confidence score is based at least upon a previous N observations of user behavior.

19. The method of claim 16, wherein updating the calculation of the confidence score further comprises performing, in the at least one computing device, a Bayesian inference on a plurality of observations of user behavior associated with the segment of interest.

20. The method of claim 13, wherein the at least one segment of interest further comprises at least one of: sex, age, income, race, marital status, familial status, home ownership status, employment status, language or a geographic location.

* * * * *